(12) United States Patent
Nakamura et al.

(10) Patent No.: US 7,127,583 B2
(45) Date of Patent: *Oct. 24, 2006

(54) DISK CONTROL SYSTEM AND CONTROL METHOD OF DISK CONTROL SYSTEM

(75) Inventors: Yasuaki Nakamura, Tokyo (JP); Akinobu Shimada, Tokyo (JP); Hideo Tabuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,177

(22) Filed: Jul. 7, 2005

(65) Prior Publication Data

US 2005/0246490 A1  Nov. 3, 2005

Related U.S. Application Data

(63) Continuation of application No. 10/643,312, filed on Aug. 18, 2003.

(30) Foreign Application Priority Data

Feb. 4, 2003 (JP) .............................. 2003-027208

(51) Int. Cl.
*G06F 12/02* (2006.01)
*G06F 9/50* (2006.01)

(52) U.S. Cl. ..................... 711/165; 711/114; 711/203

(58) Field of Classification Search ........ 711/113–114, 711/154, 165, 203
See application file for complete search history.

(56) References Cited

U.S. PATENT DOCUMENTS

| | | | |
|---|---|---|---|
| 6,532,527 B1 | 3/2003 | Selkirk et al. | |
| 6,684,313 B1* | 1/2004 | Voigt et al. | ................. 711/170 |
| 6,697,866 B1 | 2/2004 | Arakawa et al. | |
| 6,823,442 B1 | 11/2004 | Cameron | |
| 6,857,059 B1 | 2/2005 | Karpoff et al. | |
| 6,895,483 B1 | 5/2005 | Eguchi et al. | |
| 6,904,441 B1* | 6/2005 | Voigt | ........................... 707/205 |
| 6,912,627 B1 | 6/2005 | Matsunami et al. | |
| 6,941,439 B1 | 9/2005 | Yagisawa et al. | |
| 2001/0020254 A1 | 9/2001 | Blumenau et al. | |
| 2002/0143793 A1* | 10/2002 | Voigt | ........................... 707/200 |
| 2003/0159058 A1 | 8/2003 | Eguchi et al. | |
| 2003/0191734 A1 | 10/2003 | Voight | |
| 2004/0143832 A1 | 7/2004 | Yamamoto et al. | |

(Continued)

FOREIGN PATENT DOCUMENTS

JP    2001-337850 A    12/2001

*Primary Examiner*—Matthew Kim
*Assistant Examiner*—Hetul Patel
(74) *Attorney, Agent, or Firm*—Townsend and Townsend and Crew LLP (57) ABSTRACT

In order to assign logical devices efficiently to logical units, a disk control system that receives a process command for writing or reading of data from an information processing device, and performs a write or read process of data with respect to a logical device corresponding to a logical unit specified by that process command, includes means for managing logical devices, which are logical storage regions that have been set in a storage region provided by a disk drive, means for storing a correspondence between logical units, which are storage regions that have been set logically, and the logical devices, and means for assigning, when a process command has been received for a logical unit to which no logical device has been assigned, a logical device to that logical unit and performing processing with regard to that logical device.

8 Claims, 6 Drawing Sheets

U.S. PATENT DOCUMENTS

| | | |
|---|---|---|
| 2005/0091266 A1* | 4/2005 | Hasegawa .............. 707/103 R |
| 2005/0125593 A1 | 6/2005 | Karpoff et al. |
| 2005/0203964 A1 | 9/2005 | Matsunami et al. |
| 2005/0257000 A1* | 11/2005 | Sonoda et al. ............. 711/112 |

* cited by examiner

LU mapping table

| LUN | LDEV# |
|---|---|
| 0 | 0001 |
| 1 | 0002 |
| ⋮ | ⋮ |

FIG.4

Global LU mapping table

| port | LUN | LDEV# |
|---|---|---|
| 1A | 0 | 0001 |
|  | 1 | 0002 |
|  | ⋮ | ⋮ |
|  | 254 | NULL (no LDEV assigned) |
|  | 255 | NULL |
| 1B | 0 | 1001 |
|  | 1 | 1002 |
|  | ⋮ | ⋮ |
|  | 255 | NULL |
| ⋮ | ⋮ | ⋮ |

FIG.5

Global LDEV table

| Flag | LDEV# |
|---|---|
| 1(Path) | 0001 |
| 1 | 0002 |
| 0(No path) | 0003 |
| ⋮ | ⋮ |
| 1 | 1001 |
| 1 | 1002 |
| ⋮ | ⋮ |
| 0 | 2001 |
| 1 | ⋮ |

DISK CONTROL SYSTEM AND CONTROL METHOD OF DISK CONTROL SYSTEM

CROSS-REFERENCE TO RELATED APPLICATIONS

The present application claims priority upon Japanese Patent Application No. 2003-027208 filed on Feb. 4, 2003, which is herein incorporated by reference.

BACKGROUND OF THE INVENTION

1. Field of the Invention

The present invention relates to disk control systems and control methods of disk control systems.

2. Related Art

As a method for supplying a storage region from a disk array device to a computer using the same, there is the method of setting logical devices (referred to in the following as "LDEVs"), which are logical storage regions that have been set in the storage region provided by the disk drives, and assigning these logical devices to logical units (referred to in the following as "LUs"), which are identifiers of the storage region that are given by the computer.

This assignment of logical devices to logical units is currently performed by a manual operation in which the operator operates a management terminal of the disk array device in accordance with such circumstances as the needs of the computer's user or the operation mode of the disk array device (see for example JP 2001-337850A).

However, with the recent advancements in the IT industry, the number of disk drives with which disk array devices are equipped has increased sharply, so that there is the problem that the operator is forced to set an enormous number of LUs and LDEVs in the operation of disk array devices, and this poses a considerable managerial burden. Moreover, with storage virtualization, there is a need for technology for assigning storage regions economically in accordance with the actual state of utilization.

SUMMARY OF THE INVENTION

In view of the above-described circumstances, it is a main object of the present invention to provide an improved disk control system and control method for a disk control system.

To achieve this object, in one aspect of the present invention, a disk control system that receives a process command for writing or reading of data from an information processing device, and performs a write or read process of data with respect to a logical device corresponding to a logical unit specified by that process command, includes:

means for managing, as units, logical devices, which are logical storage regions that have been set in a storage region provided by a disk drive;

means for storing a correspondence between the logical devices and logical units, which are storage regions that have been set logically; and means for assigning, when a process command has been received for a logical unit to which no logical device has been assigned, a logical device to that logical unit and performing processing with regard to that logical device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DESCRIPTION OF THE PREFERRED EMBODIMENTS

At least the following matters will be made clear by the explanation in the present specification and the description of the accompanying drawings.

Overview of the Disclosure At least the following matters will be made clear from the following disclosure:

The logical devices correspond to the above-mentioned LDEVs, for example. The logical units correspond to the above-mentioned LUs, for example. The process commands may be commands as specified by the SCSI (small computer system interface) standard. The disk control system may be, for example, a disk array device as explained below.

With the disk control system of the present invention, when a process request has been received for a logical unit to which no logical device has been assigned, then a logical device is automatically assigned to that logical unit, so that there is no need for an operator or the like to manually assign an LDEV to that LU, and the operator is freed from such assignment tasks. Moreover, by adopting a configuration with which the storage devices are assigned when there is a data writing request, the storage region provided by the disk drives can be utilized efficiently.

In one aspect of the present invention, the disk control system further includes means for responding to the information processing device, when a process command that does not cause a process with regard to the logical device has been received from the information processing device, by performing a process corresponding to that process command without performing the assignment.

Here, a "process command that does not cause a process with regard to the logical device", is, as explained below, for example a command such as "Report LUN," "Inquiry," or "Read Capacity" in accordance with the SCSI standard. These commands are commands requesting information regarding the logical unit, so that even if no logical device is associated with that logical unit, a response to that command can be sent back to the information processing device. Consequently, if a process command is received for a logical unit to which no logical device has been assigned, then limited storage resources can be utilized efficiently without assigning a logical device to that logical unit when receiving such commands. Furthermore, since no processing is performed with regard to the assigning of logical devices, a response can be sent back quickly to the information processing device.

In another aspect of the present invention, the disk control system further includes means for assigning a plurality of the logical devices to one of the logical units, and means for assigning to that logical unit only a number of the logical devices that is necessary in order to perform the processing corresponding to the process command.

For example, if the storage region of the logical units is larger than the storage region of the logical devices, and the process command is a command for only a portion of the storage region of a logical unit, then there is the possibility that logical devices are needlessly taken up if logical devices are assigned to across the entire storage region of the logical unit. On the other hand, by assigning a plurality of logical devices to one logical unit, there is the possibility to assign, in steps, only the necessary number of logical devices to the logical unit, so that limited storage resources can be utilized more efficiently.

In another aspect of the present invention, the disk control system further includes means for sending to the information processing device a message indicating that the process command cannot be processed, if there is no logical device that can be assigned to the logical unit.

Thus, the information processing device can be made aware of the fact that the disk control system cannot process the processing command.

In another aspect of the present invention, the disk control system further includes means for sending to the information processing device a message indicating that reading is impossible, if a process command requesting the reading of data from a logical unit to which no logical device has been assigned has been received from the information processing device.

Thus, the information processing device can be made aware of the fact that the disk control system cannot read out the data.

In another aspect of the present invention, if the disk control system has received a process command for the logical unit, and if a logical device is assigned to the logical unit, a process corresponding to the process command is performed with regard to that logical device, and, if no logical device is assigned to the logical unit, a logical device is assigned to the logical unit and a process corresponding to the process command is performed with regard to that logical device.

Thus, if no logical device is assigned to the logical unit, a logical device is automatically assigned to the logical unit, and the managerial burden on the operator is alleviated.

In another aspect of the present invention, if the disk control system has received a process command for the logical unit, then, if a logical device has been assigned to that logical unit, a process corresponding to that process command is performed with that logical device; if no logical device has been assigned to that logical unit and that process command is a command that does not cause a process with regard to the logical device, a process corresponding to that process command is performed without assigning a logical device to that logical unit; and if no logical device has been assigned to that logical unit and that process command is a command that causes a process with regard to the logical device, a logical device is assigned to the logical unit and a process corresponding to that process command is performed with regard to that logical device.

Thus, if no logical device is assigned to the logical unit, and the process command is a command that does not cause a process with regard to the logical device, then a process corresponding to this process command is performed without assigning a logical device to the logical unit, so that a flexible response to process commands becomes possible, and it can be prevented that logical devices are needlessly assigned.

System Configuration

Figure 1:
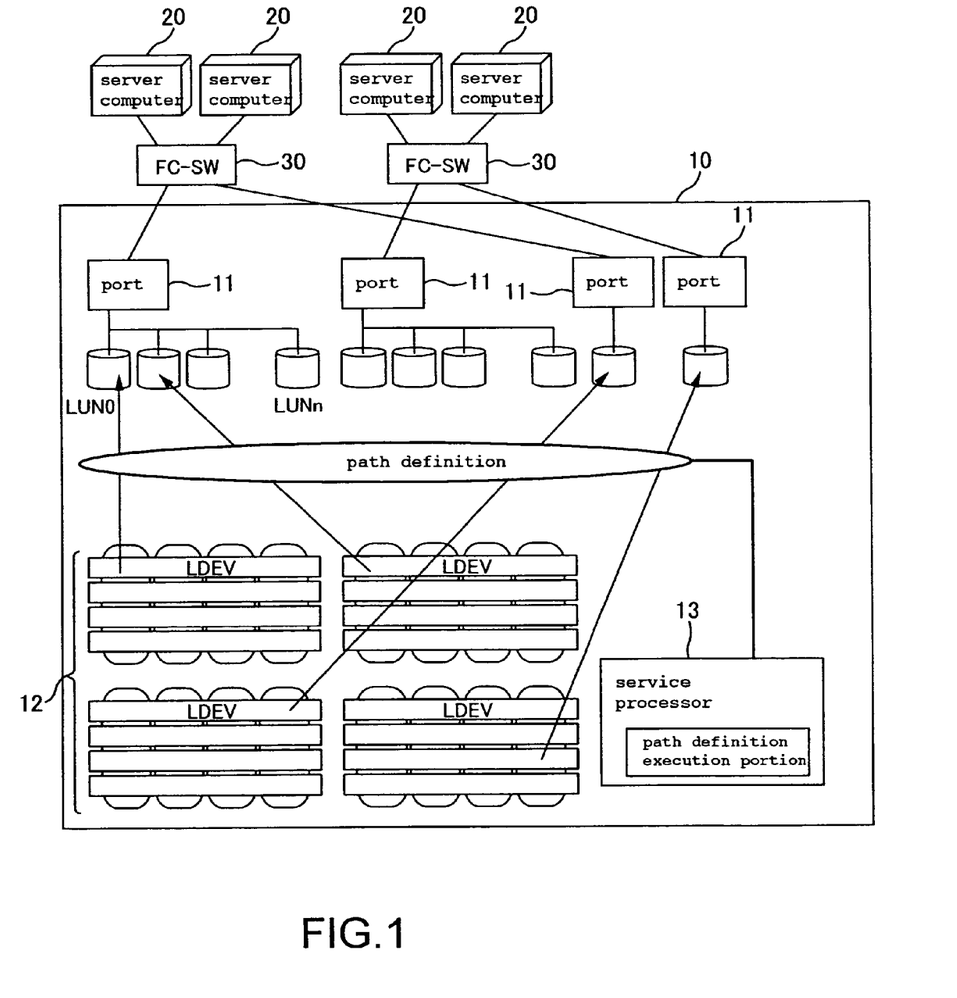
FIG. 1 is a diagram showing the configuration of a storage system in accordance with a working example of the present invention.

FIG. 1 shows the configuration of a storage system explained as a working example of the present invention. A disk array device 10 and server computers 20 are connected via fibre channel switches 30. The server computers 20, which are examples of information processing devices, are open-system computers, that is, personal computers or work stations running an open-system OS (operating system). The disk array device 10 includes a plurality of ports 11, which are connected to ports of the fibre channel switches 30, as well as disk drives 12, and a server processor 13.

The storage region provided by the disk drives 12 is managed in units of logical devices (referred to as "LDEVS" in the following), which are logical storage regions that have been set in this storage region. The disk drives 12 may be controlled in RAID (redundant array of inexpensive disks) format, in which case the LDEVs are arranged in RAID groups, which are storage regions provided in the RAID format. It should be noted that in FIG. 1, a configuration is shown in which the disk drives 12 are accommodated within the casing of the disk array device 10, but it is also possible to accommodate them in a casing that is separate from that of the disk array device 10.

The server computers 20 specify the storage region provided by the disk drives 12 in units referred to as logical units ("LUs" in the following). Each LU is given a LUN (logical unit number), which is a unique identifier. In the server computers 20, the LUNs may be drive names, for example, or they may be device file names, as explained below.

The specifications for each LU, such as the storage capacity, are set by the operator of the disk array device 10, and stored in a memory (not shown in the drawings) with which the disk array device 10 is provided. Alternatively, the LU specifications defined by the user with the server computers 20 may be stored in a memory.

Figure 2:
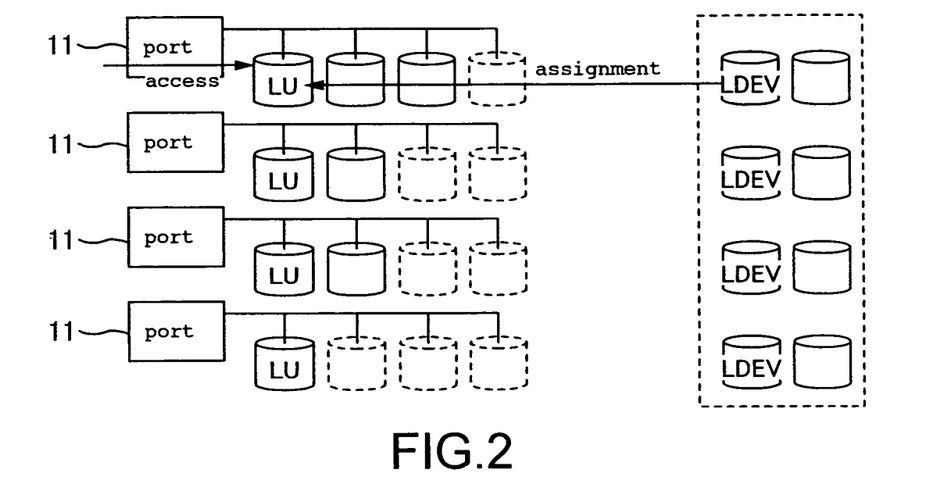
FIG. 2 is a diagram showing the relationship between the ports, the LUs assigned to the ports, and the LDEVs assigned to the LUs, in a working example of the present invention.

One or more LUs are assigned to each of the ports 11. One or more LDEVs are assigned to an LU. FIG. 2 shows the correspondence relationship between the ports 11, the LUs assigned to the ports 11, and the LDEVs assigned to the LUs. It should be noted that the assignment of the LUs to the ports 11 and of the LDEVs to the LUs is sometimes referred to as "path definition."

The assignment of the LUs to the ports 11 and the assignment of the LDEVs to the LUs can be performed by the operator from the service processor 13. The assignment of the LDEVs to the LUs can also be performed automatically, as will be explained below.

Explanation of the Processing

The following is an explanation of the processing performed in the disk array device 10 when a process command in pursuance with the SCSI standard has been received that has been sent from the server computers 20 via the fibre channel switches 30.

Figure 3:
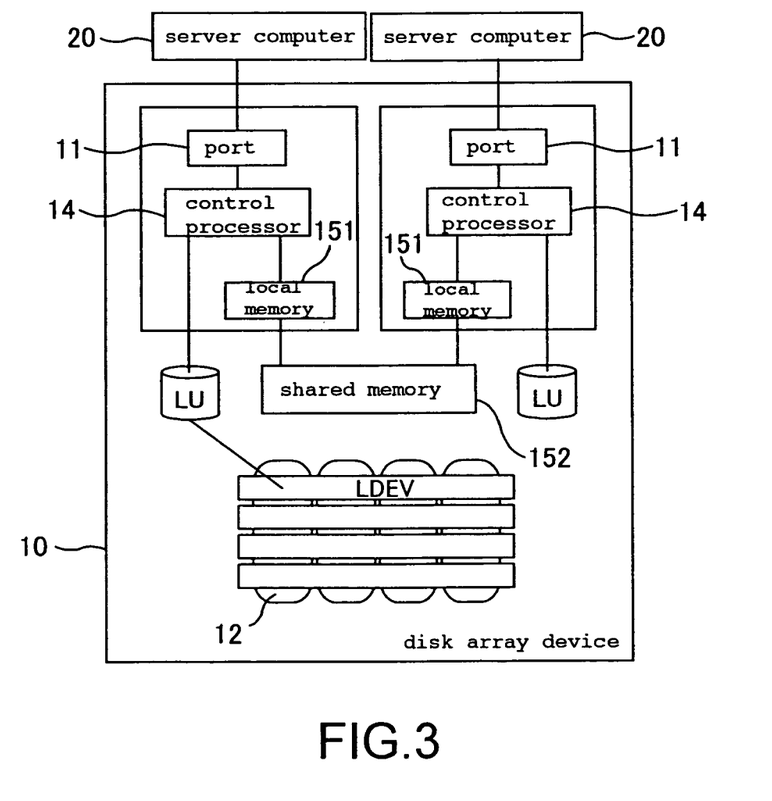
FIG. 3 is a diagram showing the overall configuration of a disk array device, in accordance with a working example of the present invention.

The following explanations refer to FIG. 3, which is a schematic diagram of the disk array device 10. The disk array device 10 is provided with control processors 14 and local memories 151 corresponding to the ports 11. Moreover, the disk array device 10 is provided with a shared memory 152, which can be referenced by the control processors 14. It should be noted that the disk array device 10 may also be provided with a cache memory (not shown in the drawings), or other type of memory, used to read or write data from or into the disk drives 12.

Figure 4:
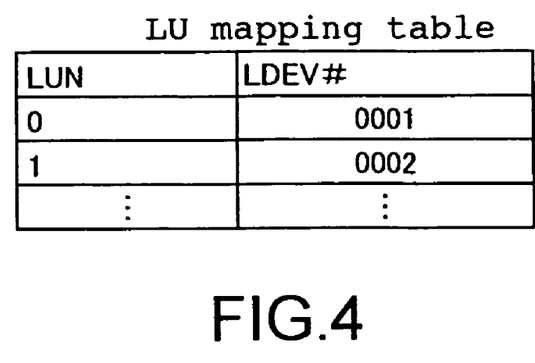
FIG. 4 is a diagram showing an example of an LU mapping table, in accordance with a working example of the present invention.

The disk array device 10 stores in the local memories 151 an LU mapping table associating the LUs and DEVS. FIG. 4 shows an example of an LU mapping table 400. The correspondence between the LUNs and the IDs of the LDEVs ("LDEV#" in FIG. 4) is registered in this table.

Figure 5:
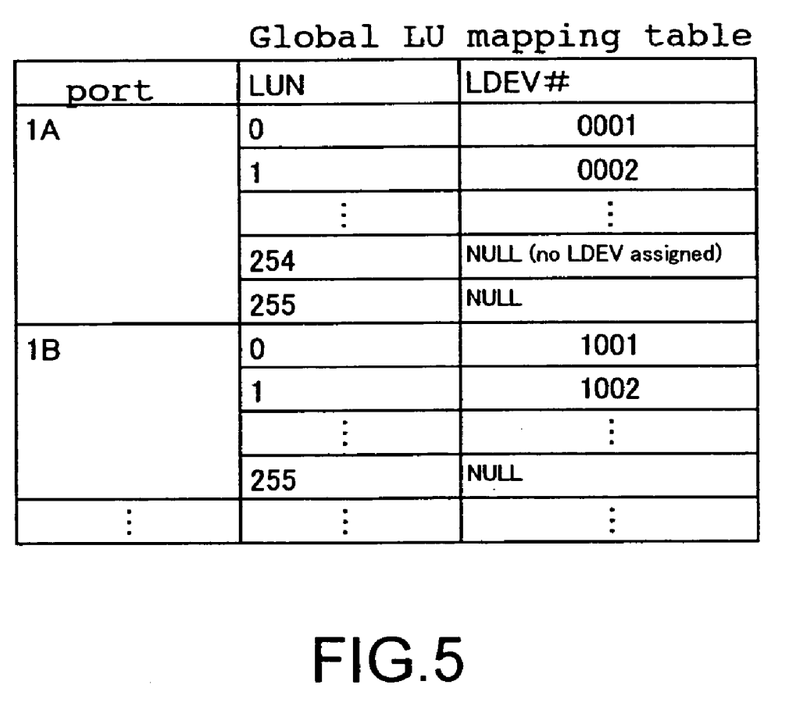
FIG. 5 is a diagram showing an example of a global LU mapping table, in accordance with a working example of the present invention.
Figure 6:
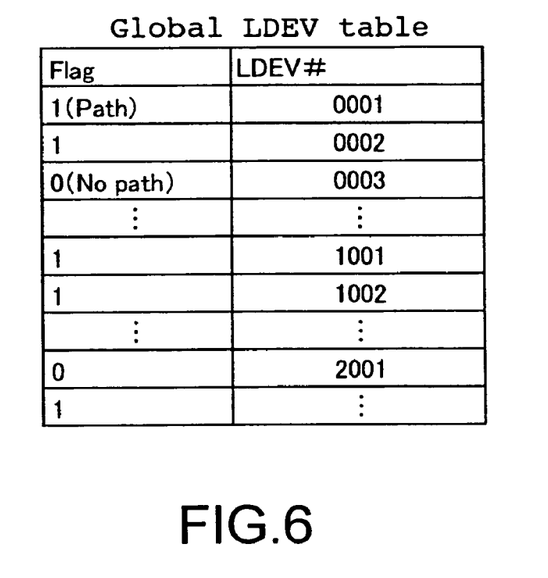
FIG. 6 is a diagram showing an example of a global LDEV table, in accordance with a working example of the present invention.

The disk array device 10 stores in the shared memory 152 a global LU mapping table, in which the correspondence between the IDS of the ports 11, the LUNs and the IDs of the LDEVs ("LDEV#" in FIG. 5) is registered. FIG. 5 shows an example of a global LU mapping table. Furthermore, the disk array device 10 stores in the shared memory 152 a global LDEV table tracking whether an LDEV has already been assigned to an LU by setting a flag in correspondence to the IDs of the LDEVs ("LDEV#" in FIG. 6). FIG. 6 shows an example of a global LDEV table 600.

The process commands in pursuance with the SCSI standard that are sent from the server computers 20 can be broadly classified into process commands that do not cause an input/output process of data with respect to the LDEVs, such as "Report LUN," "Inquiry," or "Read Capacity," (referred to as "type I process commands" in the following) and process commands that do cause an input/output process of data with respect to the LDEVs, such as "Write" (data write command) or "Read" (data read command) (referred to as "type II process commands" in the following). The following is a more detailed explanation of the processing when type I or type II process commands are received with the disk array device 10.

(1) Type I Process Commands

Figure 7:
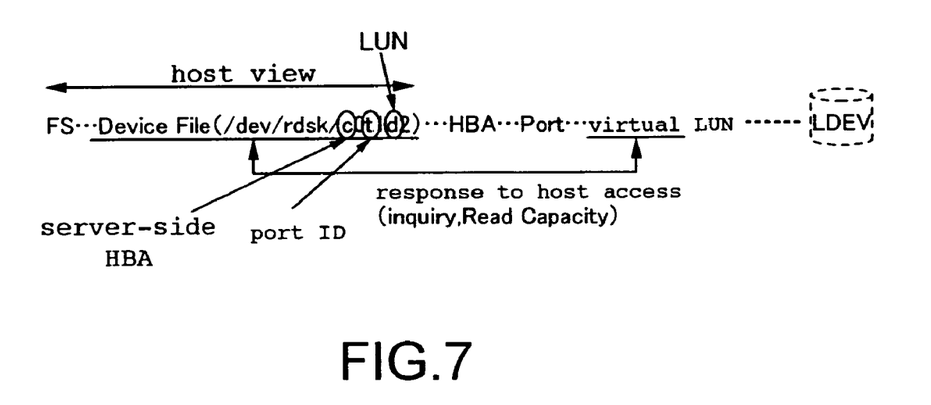
FIG. 7 is a diagram illustrating the principle of a type I process command, in accordance with a working example of the present invention.

The following is an explanation of the processing of the disk array device 10, when a type I process command has been received. FIG. 7 illustrates the principle of a type I process command. In this example, a file system such as NFS (network file system) is operated on a server computer, and the LUNs are associated with device files in this file system. In FIG. 7, "/dev/rdsk/c0t1d2" is a device file name, wherein "/dev/rdsk/" is the directory name. Furthermore, "c0" is an identifier for the HBA (host bus adapter) of the server computer, and is ordinarily the WWN (world wide name) of the HBA. "t1" is the ID of the port to which the LU belongs, and "d2" is the LUN.

In this example, a type I process command is sent from a server computer 20 via the HBA and the port 11 to the disk array 10, for the LUN associated with the device file. In FIG. 7, "virtual LUN" is a LUN for an LU to which no LDEV has yet been assigned. It should be noted that an LU to which no LDEV has been assigned is an LU in which the field LDEV in the global LU mapping table 500 in FIG. 5 has been set to "NULL".

If the disk array device 10 receives a type I process command, it generates response data including the necessary information for responding to this process command, and the response data is sent to the server computer 20. Here, the processing for a type I process command is carried out also when the process command is for an LU to which no LDEV has yet been assigned. The information included in the response data may be stored by the disk array device 10, or it may be collected by the disk array device 10 when a process command is received.

(2) Type II Process Commands

The following is an explanation of the processing of the disk array device 10, when a type II process command has been received.

Figure 8:
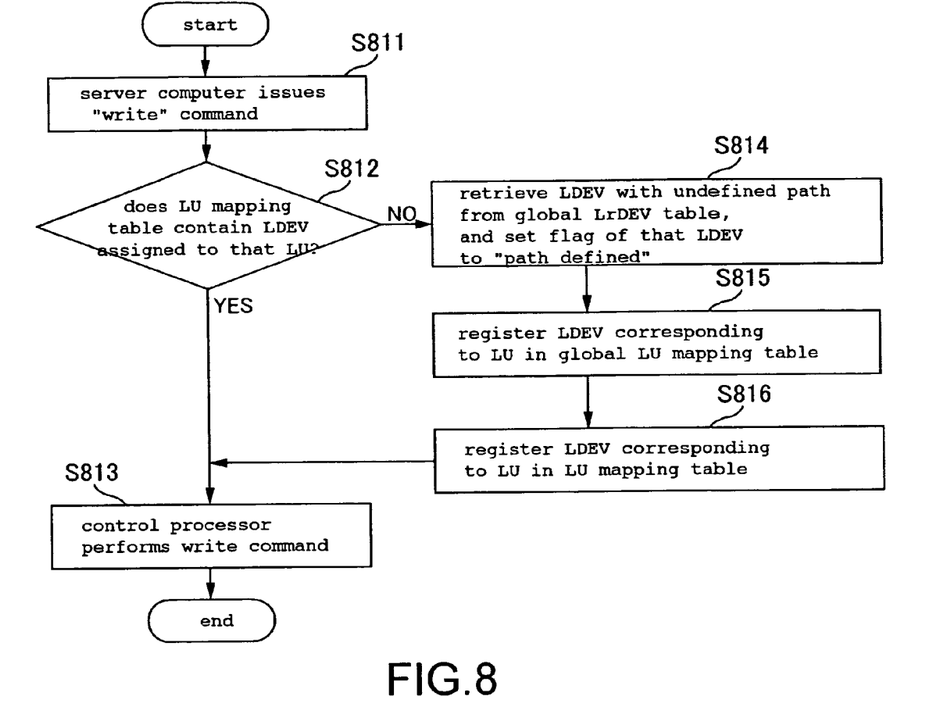
FIG. 8 is a flowchart illustrating the processing of the disk array device in the case that the type II process command is "Write" (data write command), in accordance with a working example of the present invention.

First, referring to the flowchart in FIG. 8, the case where the type II process command is "Write" (data write command) is explained. When the disk array device 10 receives a data write command from the server computer 20 (S811), it references the LU mapping table 400 in FIG. 4, and determines whether an LDEV has been assigned to the LU specified by this data write command (S812).

If an LDEV has been assigned (S812: YES), then the control processor 14 performs the data writing for this data write command with this LDEV (S813).

On the other hand, if no LDEV has been assigned (S812: NO), then the control processor 14 retrieves a non-assigned LDEV from the global LDEV table 600 in the shared memory 152, assigns the retrieved LDEV to the LU specified with this data writing request, and sets the flag for that LDEV in the global LDEV table 600 to ON ("1") (path definition; S814).

Figure 9:
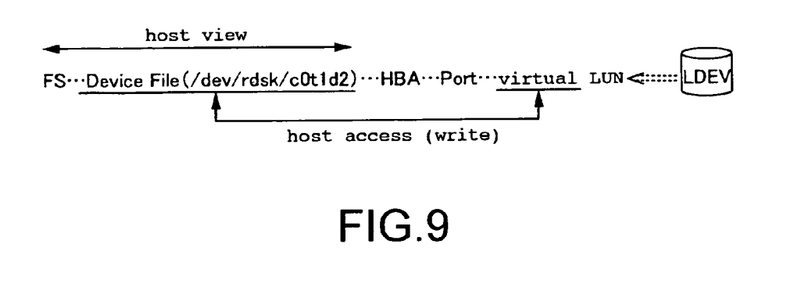
FIG. 9 is a diagram illustrating the principle of a type II process command, in accordance with a working example of the present invention.

FIG. 9 illustrates the principle of a type II process command. It should be noted that this retrieval algorithm and the selection algorithm deciding which LDEV is selected in case that a plurality of LDEVs have been retrieved can be set in accordance with such circumstances as the user needs and the operation mode of the disk array device 10.

Next, the control processor 14 registers the identifier of the assigned LDEV by associating the LDEV with the corresponding LU of the global LU mapping table 500 in the shared memory 152 (S815). Moreover, the control processor 14 registers the identifier of the LDEV that has been assigned to the corresponding LU of the LU mapping table in the local memory 151 corresponding to that control processor 14 (S816). Then, after that processing, the control processor 14 writes the data for that data write command into the assigned LDEV (S813).

It should be noted that if all LDEVs have been assigned and a data write command is received for an LU to which no LDEV has been assigned, then a message to the effect that assignment is not possible may be sent to the server computer 20.

Moreover, the storage capacity of the LUs may be set such that it is the same as the storage capacity of the LDEVS, but it may also be set to a storage capacity that is different from that of the LDEVs.

Figure 10:
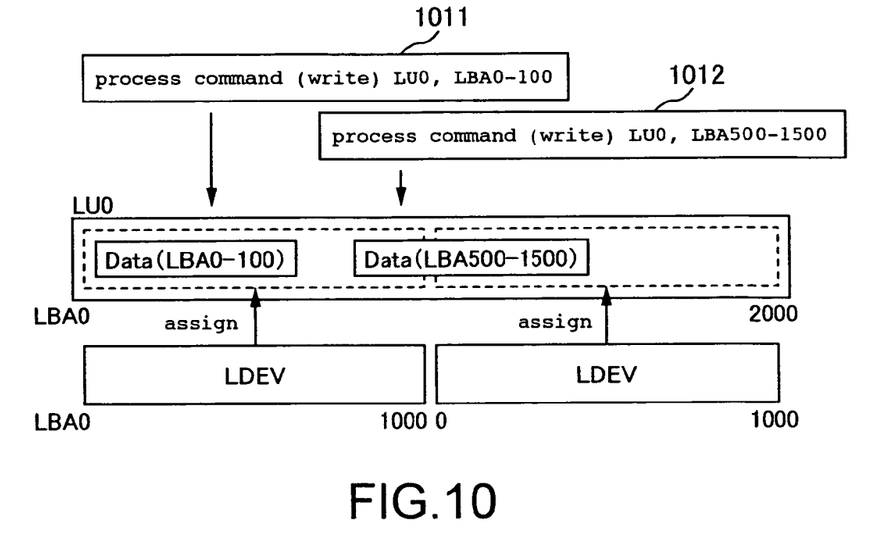
FIG. 10 is a diagram illustrating an example of an assignment method, in accordance with a working example of the present invention, for the case that the storage capacity set for the LUs is larger than the storage capacity of the LDEVS.

FIG. 10 shows an example of an assignment method for the case that the storage capacity of the LUs has been set larger than the storage capacity of the LDEVs. In FIG. 10, a storage region specified by the LBA (logical block address) 0 . . . 2000 is set for the LU with the LUN "LU0," and LDEVs provided with a storage region with a capacity that is specified by LBA 0 . . . 1000 are assigned as the storage region of this LU.

Furthermore, in this example, two LDEVs are automatically assigned to the LU. That is to say, first, the disk array device 10 receives a data write command 1011 for the LBA 0 . . . 100 from the server computer 20, and a number of LDEVs covering a storage capacity corresponding to this LBA 0 . . . 100 (here, one LDEV) are assigned to the storage region corresponding to LBA 0 . . . 1000 of the LU. Then, the disk array device 10 receives a data write command 1012 for the LBA 500 . . . 1500 from the server computer 20, and since the command cannot be handled with only the LDEV that has already been assigned, a new LDEV is assigned as the storage region corresponding to LBA 1000 . . . 2000 of the LU.

As has been explained above, with the disk array device 10 of this working example, LDEVs are assigned to LUs to which no LDEV has yet been assigned only after a data write command for that LU has been received. That is to say, an LDEV is assigned to an LU only when it has become necessary, which enhances the efficient utilization of the storage region provided by the LDEVS, that is, the disk drives 12. Furthermore, the assignment of LDEVs to LUs is carried out automatically in this manner by the disk array device 10, so that also the managerial burden on the user or the operator is alleviated tremendously.

Figure 11:
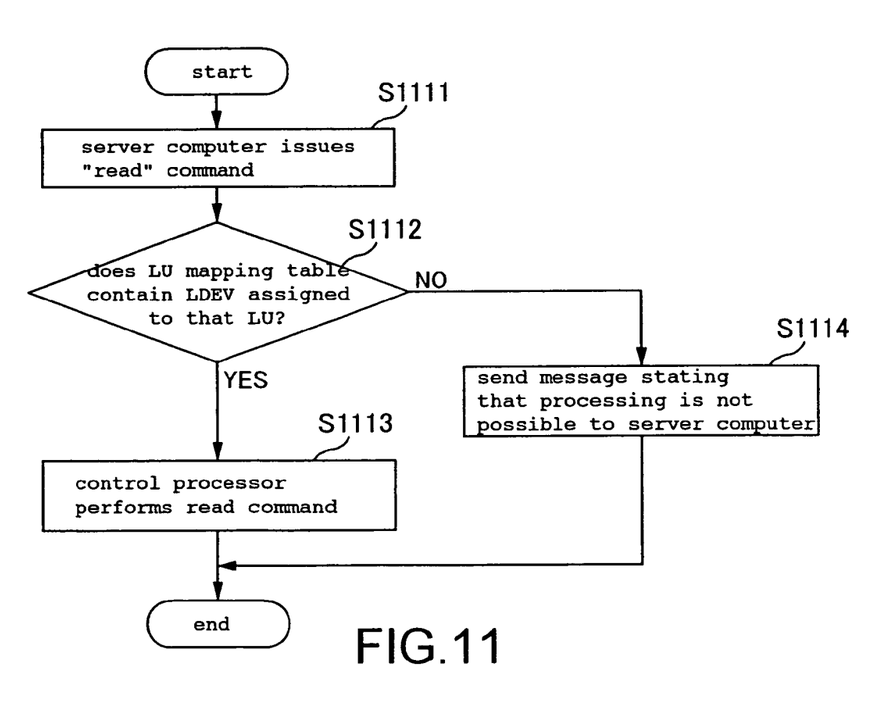
FIG. 11 is a flowchart illustrating the processing of the disk array device in the case that the type II process command is "Read" (data read command), in accordance with a working example of the present invention.

Referring to the flowchart in FIG. 11, the following is an explanation of the case that the type II process command is a data read command ("Read"). When the disk array device 10 receives a data read command from the server computers 20 (S1111), it references the LU mapping table 400, and determines whether an LDEV is assigned to the LU specified by this data read command (S1112).

If an LDEV is assigned (S112: YES), the control processor 14 reads out the data from the LDEV in accordance with this data read command (S1113).

On the other hand, if no LDEV is assigned (S1112: NO), then the control processor 14 sends to the server computer 20 a message stating that the processing of this data read command is not possible (S1114).

The foregoing explanations were for a disk control system in accordance with the present invention, but the above-described embodiments of the invention are merely given to facilitate the understanding of the present invention, and the present invention is not limited thereto. Modifications, improvements and equivalents not departing from the spirit of the present invention are intended to be included therein.

The present invention provides a disk control system and a control method for a disk control system.

Although the preferred embodiment of the present invention has been described in detail, it should be understood that various changes, substitutions and alterations can be made therein without departing from spirit and scope of the inventions as defined by the appended claims.

What is claimed is:

1. A control method for a disk control system for managing, as units, logical devices, the logical devices being logical storage regions defined in a storage region provided by a disk drive, said disk control system further for storing a correspondence between said logical devices and logical units, said disk control system further for receiving a process command sent from an information processing device, said disk control system further for performing processing with respect to a logical device corresponding to the logical unit specified by said process command, the control method comprising:

a first step of receiving a process command for a logical unit to which no logical device has been assigned;

a second step of assigning to said logical unit a logical device when a process command has been received for said logical unit which requires data transfer with said logical unit; and a third step of performing said process command with regard to said logical device assigned in said second step.

2. The method of claim 1 wherein if said process command is a write command, then assigning a logical device having available storage capacity greater than the amount of data associated with said write command.

3. The method of claim 1 wherein if said process command is a write command and if said logical device lacks available capacity to store data associated with said write command, then assigning an additional logical device having available storage capacity to store a remaining portion of said data.

4. The method of claim 1 wherein if said process command is in accordance with the SCSI standard, then determining whether or not to assign an additional logical device based on said process command.

5. A disk control system for managing, as units, logical devices which are logical storage regions that have been set in a storage region provided by a disk drive, the disk control system comprising:

a processor: and a memory to store a correspondence between said logical devices and logical units, which are storage regions that have been set logically:

said processor configured to perform steps of:

receiving a process command for a logical unit to which no logical device has been assigned, the process command having been sent from an information processing device;

assigning to that logical unit a logical device, when a process command has been received for said logical unit which requires data transfer with said logical unit; and performing said process command with regard to said logical device that has been assigned in said assigning step.

6. The system of claim 5 wherein if said process command is a write command, then assigning a logical device having available storage capacity greater than the amount of data associated with said write command.

7. The system of claim 6 wherein if said process command is a write command and if said logical device lacks available capacity to store data associated with said write command, then assigning an additional logical device having available storage capacity to store a remaining portion of said data.

8. The system of claim 6 wherein if said process command is in accordance with the SCSI standard, then determining whether or not to assign an additional logical device based on said process command.

* * * * *